United States Patent
Kennedy et al.

(10) Patent No.: US 7,631,353 B2
(45) Date of Patent: Dec. 8, 2009

(54) BLOCKING REPLICATION OF E-MAIL WORMS

(75) Inventors: Mark Kennedy, Redondo Beach, CA (US); Charles Renert, Belmont, MA (US)

(73) Assignee: Symantec Corporation, Mountain View, CA (US)

( * ) Notice: Subject to any disclaimer, the term of this patent is extended or adjusted under 35 U.S.C. 154(b) by 1098 days.

(21) Appl. No.: 10/322,289

(22) Filed: Dec. 17, 2002

(65) Prior Publication Data

US 2004/0117641 A1    Jun. 17, 2004

(51) Int. Cl.
G06F 11/00 (2006.01)
G06F 12/14 (2006.01)
G06F 12/16 (2006.01)
G08B 23/00 (2006.01)

(52) U.S. Cl. ......................................................... 726/22
(58) Field of Classification Search ........................ None
See application file for complete search history.

(56) References Cited

U.S. PATENT DOCUMENTS

| | | | |
|---|---|---|---|
| 5,440,723 A | 8/1995 | Arnold et al. | |
| 5,452,442 A | 9/1995 | Kephart | |
| 5,473,769 A | 12/1995 | Cozza | |
| 5,572,590 A | 11/1996 | Chess | |
| 5,696,822 A | 12/1997 | Nachenberg | |
| 5,715,174 A | 2/1998 | Cotichini et al. | |
| 5,715,464 A | 2/1998 | Crump et al. | |
| 5,758,359 A | 5/1998 | Saxon | |
| 5,812,763 A | 9/1998 | Teng | |
| 5,889,943 A * | 3/1999 | Ji et al. | 726/22 |
| 5,951,698 A * | 9/1999 | Chen et al. | 714/38 |
| 5,956,481 A * | 9/1999 | Walsh et al. | 726/23 |
| 5,960,170 A | 9/1999 | Chen et al. | |
| 5,978,917 A | 11/1999 | Chi | |
| 5,987,610 A | 11/1999 | Franczek et al. | |
| 6,052,709 A | 4/2000 | Paul et al. | |
| 6,070,244 A | 5/2000 | Orchier et al. | |
| 6,072,830 A | 6/2000 | Proctor et al. | |
| 6,088,803 A | 7/2000 | Tso et al. | |

(Continued)

FOREIGN PATENT DOCUMENTS

EP    1 280 039 A    1/2003

(Continued)

OTHER PUBLICATIONS

Symantec Corporation "Norton AntiVirus Corporation Edition 7.0" Manual, 1999, Version 1, 44 pages.

(Continued)

*Primary Examiner*—Matthew B Smithers
*Assistant Examiner*—Nadia Khoshnoodi
(74) *Attorney, Agent, or Firm*—Fenwick & West LLP

(57) ABSTRACT

Computer-implemented methods, apparati, and computer-readable media for blocking the replication of computer worms in a computer. A method of the present invention comprises the steps of: for an e-mail program installed on the computer, finding the location of a temporary holding area used by the e-mail program for storing and opening e-mail attachments; monitoring the temporary holding area for openings of target programs stored within the temporary holding area; and upon the opening of a target program for execution, implementing a worm mitigation procedure.

24 Claims, 3 Drawing Sheets

U.S. PATENT DOCUMENTS

| | | | |
|---|---|---|---|
| 6,094,731 | A | 7/2000 | Waldin et al. |
| 6,104,872 | A | 8/2000 | Kubota et al. |
| 6,108,799 | A | 8/2000 | Boulay et al. |
| 6,167,434 | A | 12/2000 | Pang |
| 6,192,379 | B1 | 2/2001 | Bekenn |
| 6,199,181 | B1 | 3/2001 | Rechef et al. |
| 6,275,938 | B1 | 8/2001 | Bond et al. |
| 6,338,141 | B1 | 1/2002 | Wells |
| 6,357,008 | B1 | 3/2002 | Nachenberg |
| 6,370,648 | B1 | 4/2002 | Diep |
| 6,493,007 | B1 | 12/2002 | Pang |
| 6,535,891 | B1 | 3/2003 | Fisher et al. |
| 6,552,814 | B2 | 4/2003 | Okimoto et al. |
| 6,611,925 | B1 | 8/2003 | Spears |
| 6,622,150 | B1 | 9/2003 | Kouznetsov et al. |
| 6,678,734 | B1 | 1/2004 | Haatainen et al. |
| 6,697,950 | B1 | 2/2004 | Ko |
| 6,721,721 | B1 | 4/2004 | Bates et al. |
| 6,748,534 | B1 | 6/2004 | Gryaznov et al. |
| 6,763,462 | B1 | 7/2004 | Marsh |
| 6,813,712 | B1 | 11/2004 | Luke |
| 6,851,057 | B1 | 2/2005 | Nachenberg |
| 6,910,134 | B1 | 6/2005 | Maher et al. |
| 6,981,279 | B1 * | 12/2005 | Arnold et al. ............. 726/22 |
| 2002/0004908 | A1 | 1/2002 | Galea |
| 2002/0035696 | A1 | 3/2002 | Thacker |
| 2002/0046275 | A1 | 4/2002 | Crosbie et al. |
| 2002/0083175 | A1 | 6/2002 | Afek et al. |
| 2002/0091940 | A1 * | 7/2002 | Welborn et al. ............. 713/201 |
| 2002/0157008 | A1 | 10/2002 | Radatti |
| 2002/0162015 | A1 | 10/2002 | Tang |
| 2002/0178374 | A1 | 11/2002 | Swimmer et al. |
| 2002/0199120 | A1 * | 12/2002 | Schmidt .................... 713/201 |
| 2003/0023865 | A1 | 1/2003 | Cowie et al. |
| 2003/0051026 | A1 | 3/2003 | Carter et al. |
| 2003/0065926 | A1 | 4/2003 | Schultz et al. |
| 2003/0115485 | A1 | 6/2003 | Milliken |
| 2003/0120951 | A1 | 6/2003 | Gartside et al. |
| 2003/0126449 | A1 | 7/2003 | Kelly et al. |
| 2003/0140049 | A1 | 7/2003 | Radatti |
| 2003/0191966 | A1 * | 10/2003 | Gleichauf .................. 713/201 |
| 2003/0212902 | A1 | 11/2003 | van der Made |
| 2003/0236995 | A1 | 12/2003 | Fretwell, Jr. |
| 2004/0015712 | A1 | 1/2004 | Szor |
| 2004/0015726 | A1 | 1/2004 | Szor |
| 2004/0030913 | A1 | 2/2004 | Liang et al. |
| 2004/0158730 | A1 | 8/2004 | Sarkar |
| 2004/0162808 | A1 | 8/2004 | Margolus et al. |
| 2004/0181687 | A1 | 9/2004 | Nachenberg et al. |
| 2005/0021740 | A1 | 1/2005 | Bar et al. |
| 2005/0044406 | A1 | 2/2005 | Stute |
| 2005/0132205 | A1 | 6/2005 | Palliyil et al. |
| 2005/0177736 | A1 | 8/2005 | De los Santos et al. |
| 2005/0204150 | A1 | 9/2005 | Peikari |
| 2006/0064755 | A1 | 3/2006 | Azadet et al. |

FOREIGN PATENT DOCUMENTS

| | | |
|---|---|---|
| GB | 2 364 142 A | 1/2002 |
| WO | WO 97/39399 A | 10/1997 |
| WO | WO 01/91403 A | 11/2001 |
| WO | WO 02/05072 A | 1/2002 |

OTHER PUBLICATIONS

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet <URL:http://www.symantec.com/press/1999/n991001.html>. Author unknown.

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfp-P.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

Szor, P., "Memory Scanning Under Windows NT", Virus Bulletin Conference, Sep. 1999, Virus Bulletin Ltd., The Pentagon, Abingdon, Oxfordshire, England, pp. 1-22.

U.S. Appl. No. 10/255,658, filed Sep. 25, 2002, Szor.

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

\* cited by examiner

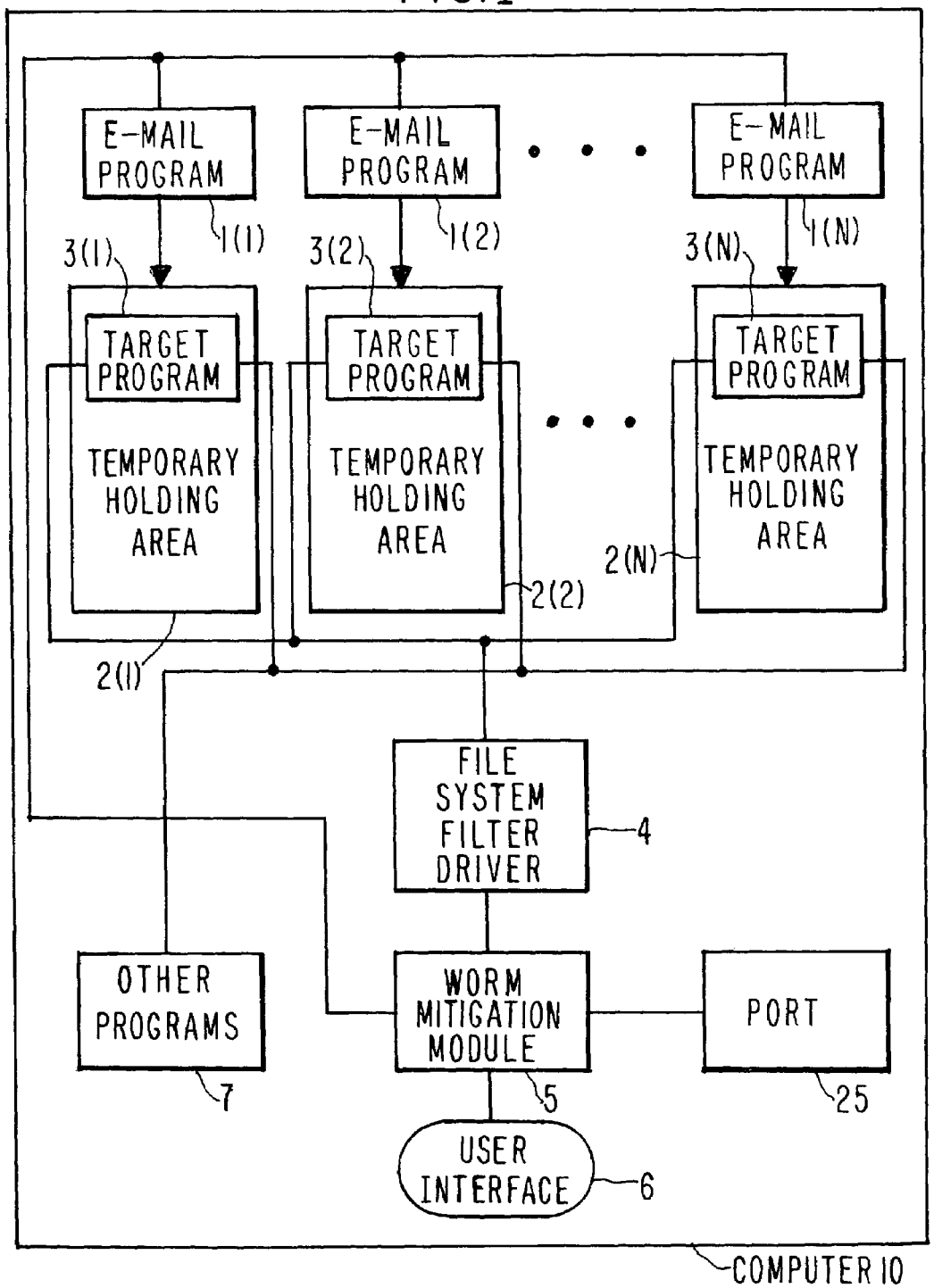

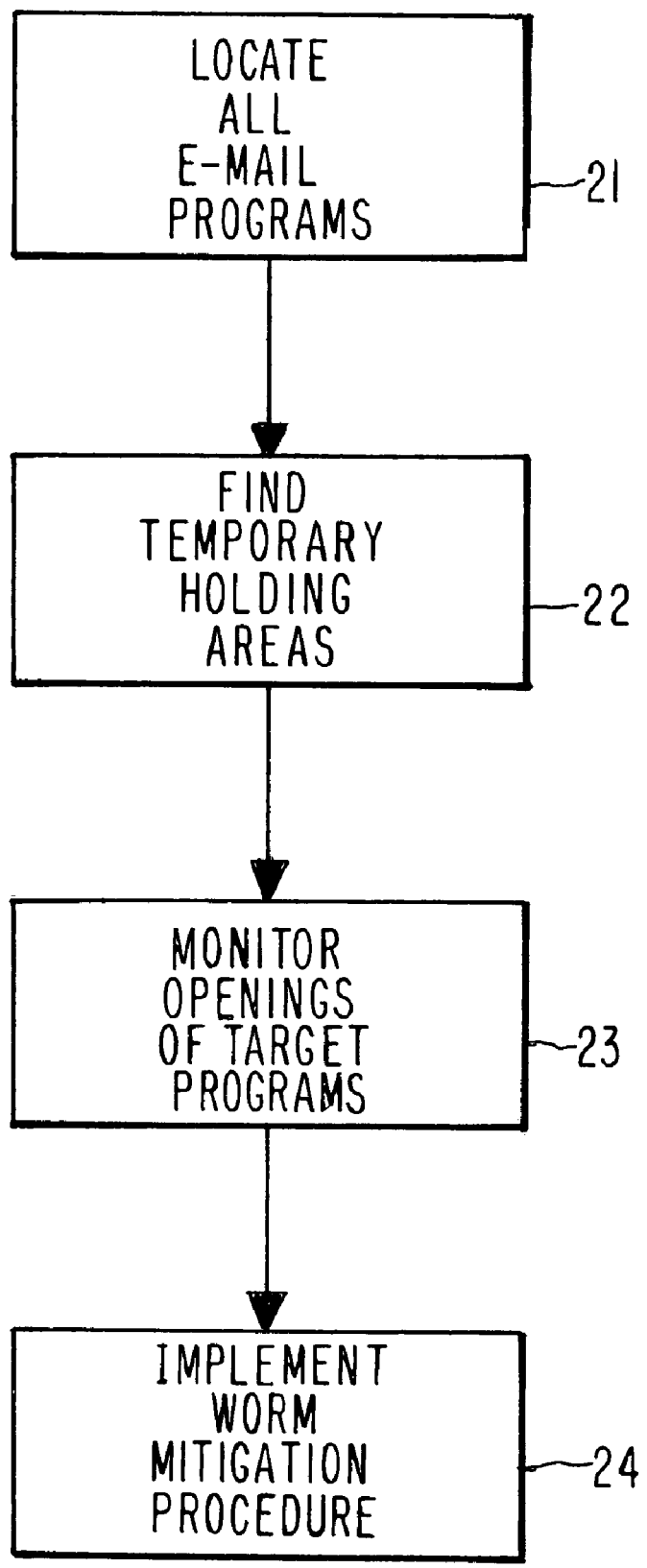

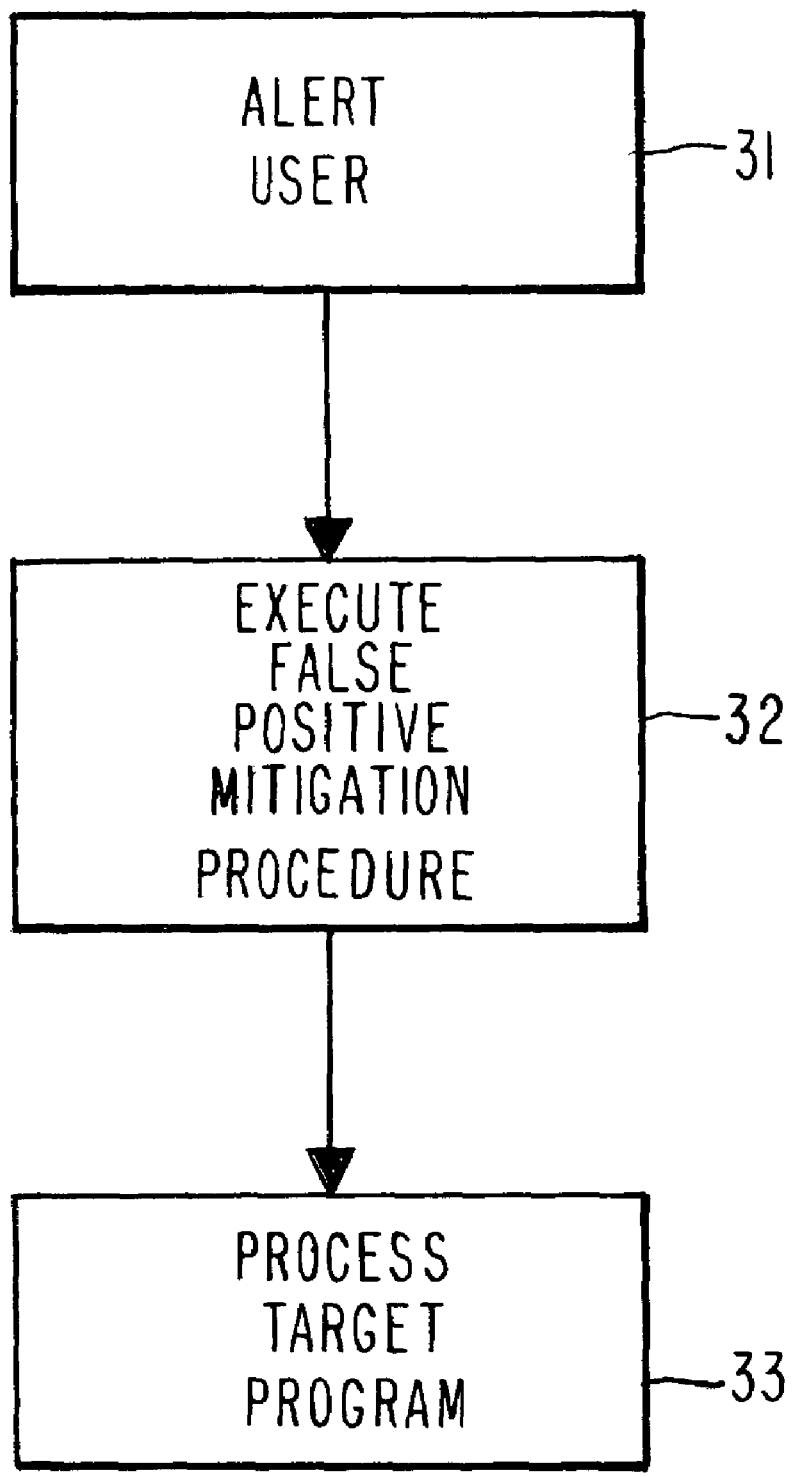

BLOCKING REPLICATION OF E-MAIL WORMS

TECHNICAL FIELD

This invention pertains to the field of detecting and blocking the replication of computer worms that spread via electronic mail (e-mail).

BACKGROUND ART

Virus, worms, and Trojan horses are types of malicious computer code. As used herein, "malicious computer code" is any code that enters a computer without an authorized user's knowledge and/or without an authorized user's consent. A worm is a type of malicious computer code that is self-replicating. A worm spreads over a network from one computer to another, usually via e-mail attachments. The operating system (OS) on the e-mail recipient's computer puts the attachment into a temporary holding area such as a temporary folder. In recent Windows operating systems, the temporary folder is a hidden folder. When the recipient clicks on the attachment or the attachment automatically executes via a vulnerability, the executable worm inside the temporary holding area opens and creates another e-mail with an attachment, i.e., the worm.

One technique for blocking the replication of worms that spread via e-mail is disclosed in commonly owned U.S. patent application Ser. No. 10/255,658 filed Sept. 25, 2002.

DISCLOSURE OF INVENTION

Computer-implemented methods, apparati, and computer-readable media for blocking the replication of computer worms in a computer (10). A method of the present invention comprises the steps of: for an e-mail program (1) installed on the computer (10), finding (22) the location of a temporary holding area (2) used by the e-mail program (1) for storing and opening e-mail attachments; monitoring (23) the temporary holding area (2) for openings of target programs (3) stored within the temporary holding area (2); and upon the opening of a target program (3) for execution, implementing (24) a worm mitigation procedure.

BRIEF DESCRIPTION OF THE DRAWINGS

These and other more detailed and specific objects and features of the present invention are more fully disclosed in the following specification, reference being had to the accompanying drawings, in which:

FIG. 1 is a block diagram showing modules suitable for implementing the present invention.

FIG. 2 is a flow diagram illustrating method steps of the present invention.

FIG. 3 illustrates additional method steps of the present invention.

DETAILED DESCRIPTION OF THE PREFERRED EMBODIMENTS

Turning to FIG. 1, a human user of computer 10 wishes to block computer worms from spreading from said computer 10. There can be any integral number N of e-mail programs 1 installed on computer 10. The way that a typical e-mail program 1 works is that attachments to incoming e-mails are placed by program 1 into a temporary holding area 2 associated with that program 1. Each program 1 has its own temporary holding area 2 associated therewith. Thus, FIG. 1 illustrates N temporary holding areas 2. The present invention pertains to the scenario in which an e-mail attachment residing within a temporary holding area 2 is an executable program 3. Such a program is referred to in the present patent application as a "target program" 3. There can be zero or a positive integral number of target programs 3 within a temporary holding area 2. FIG. 1 illustrates the case where there is one target program 3 within each temporary holding area 2.

A file system filter driver module 4 is coupled to each temporary holding area 2, and monitors when a target program 3 is opened. File system filter driver 4 has the capability of determining whether target program 3 is opening as an executable or is opening as data. A worm mitigation module 5 is coupled to file system filter driver 4, to each e-mail program 1, and to port 25, a conventional port found on many computers 10. A plurality of other programs 7 may reside on computer 10 and may be coupled to target programs 3, e.g., for purposes of opening target programs 3. A user interface 6, such as a video monitor, is coupled to worm mitigation module 5.

File system filter driver 4 and worm mitigation module 5 can be implemented in hardware, firmware, and/or software; and are normally implemented in software.

FIG. 2 illustrates method steps of the present invention. At step 21, worm mitigation module 5 locates all e-mail programs 1 installed on computer 10. This can be accomplished by any one of a number of conventional techniques, such as obtaining information from the user of the computer 10, having software search for common e-mail programs 1 by name, or having software search for programs that access port 25. Port 25 is officially recognized by TCP/IP (Transport Control Protocol/Internet Protocol). The standard protocol for sending e-mail over the Internet, SMTP (Simple Mail Transfer Protocol), specifies that any e-mail to be sent over the Internet must be sent via port 25.

In step 22, worm mitigation module 5 finds the temporary holding area 2 associated with each e-mail program 1. This can be done, for example, by sending a test e-mail to computer 10 and seeing where program 1 places the attachment; or by obtaining information from the vendor of the e-mail program 1.

At step 23, file system filter driver 4 monitors the opening of target programs 3 residing within temporary holding areas 2. As stated above, driver 4 has the capability to distinguish between openings of programs 3 for execution and openings of programs 3 as data. At step 24, when driver 4 detects the opening of a target program 3 for execution, worm mitigation module 5 is immediately instructed to implement a worm mitigation procedure.

Four embodiments of worm mitigation procedure 24 will be described herein.

In a first embodiment of worm mitigation procedure 24, target program 3 is prevented from opening itself as data. Driver 4 has the ability to detect such an event on a real time basis. When the event begins to occur, module 5 simultaneously aborts the opening. The theory behind this procedure is that an e-mail attachment opening itself as data is a strong indication that the attachment is a worm attempting to replicate itself.

With reference to FIG. 3, module 5 may optionally alert 31 the user of computer 10, via user interface 6, upon the occurrence of the target program 3 attempting to open itself as data. This alerts the user to the possibility of a worm.

At step 32, a false positive mitigation procedure is executed in order to minimize the risk of a false positive declaration of a worm. For example, program 3 could be opening itself as data simply to unpack or unzip a set of files. False positive mitigation procedure 32 can be performed by module 5. When module 5 finds (deems) that a false positive has occurred, module 5 allows the target program 3 to open itself as data. The finding of a false positive is based upon the occurrence of at least one criterion from a set of preselected false positive criteria. For this first embodiment of worm mitigation procedure 24, said false positive criteria can include, for example, the following:

False positive criterion number 1. The target program 3 is a self-extractor, such as an unzip program or an unpack program.

False positive criterion number 2. The target program 3 has a valid digital signature affixed thereto. For example, it may be preselected that such a digital signature must be a class 3 digital signature in the Authenticode system promulgated by Microsoft Corporation. In order for this criterion to be satisfied, module 5 must verify the validity of the digital signature, e.g., by checking the authenticity of the public key used by the trusted third party such as VeriSign that has affixed the digital signature.

False positive criterion number 3. The target program 3 must pass at least one additional test that was preselected when the worm mitigation procedure 24 was designed, to confirm the presence of a worm. Such a test may be, for example, subjecting target program 3 to antivirus scanning software, subjecting target program 3 to behavior blocking software, or sending target program 3 in an encrypted form to the headquarters of an antivirus software company such as Symantec Corporation for further analysis.

Finally, in step 33, worm mitigation module 5 processes target program 3 upon the occurrence of target program 3 attempting to open itself as data. As used herein, "processes" can mean: 1) module 5 deletes program 3 from computer 10; 2) module 5 aborts or blocks the method being performed by program 3; 3) module 5 blocks the method being performed by program 3 and quarantines program 3; 4) module 5 attempts a heuristic repair of program 3, and if successful, allows the method being performed by program 3 to proceed; or 5) module 5, upon receipt of appropriate instructions from the user of computer 10 via user interface 6, allows the method being performed by program 3 to proceed.

In the second embodiment of worm mitigation procedure 24, module 5 prevents any program 7 anywhere on computer 10 from opening target program 3 as data. This embodiment is an extension of the first embodiment of worm mitigation procedure 24 described above. The theory behind this embodiment is that a worm 3 may ask another program 7 to open it, in an attempt to disguise its true malicious character.

In this second embodiment, optional step 31 entails alerting the user when any program 7 attempts to open the target program 3 as data.

In this second embodiment, target program 3 is allowed to be opened as data by said other program 7 when the false positive mitigation procedure 32 deems said opening to be a false positive. Again, such a determination is made by module 5 based upon a preselected set of false positive criteria, such as those described above in conjunction with the first embodiment of worm mitigation procedure 24.

In this second embodiment, the step of processing 33 the target program 3 is done when said other program 7 attempts to open target program 3 as data. "Processing" can entail any one of the five options detailed above.

In the third embodiment of worm mitigation procedure 24, module 5 prevents target program 3 from accessing port 25. The theory behind this embodiment is that an e-mail being sent to the Internet out of a temporary holding area 2 raises a high degree of suspicion that a worm is present.

In one embodiment, nothing is allowed to pass through port 25. In an alternative embodiment, an e-mail is allowed to pass through port 25 but an e-mail attachment is not allowed to pass through port 25, because it is more likely that the malicious code will be in the e-mail attachment than in the e-mail body. This alternative embodiment is in essence a false positive mitigation technique, because an e-mail setup program could be sending registration information over the Internet, e.g., via a MAPI (Mail Application Programming Interface).

In this third embodiment, step 31 entails alerting the user that a target program 3 is attempting to access port 25. This warns the user that a worm may be present.

In this third embodiment, the execution of the false positive mitigation procedure 32 results in the target program 3 being allowed to access port 25 when said accessing is deemed by module 5 to be a false positive, based upon a set of preselected criteria. In this case, the false positive criteria may consist of false positive criteria 2 and 3 as described above.

In this third embodiment, target program 3 is processed at step 33 when target program 3 attempts to access port 25. Again, step 33 can entail any one of the five options detailed above.

In the fourth embodiment of worm mitigation procedure 24, module 5 blocks all e-mail programs 1 on computer 10 from opening any executable program 7 anywhere on computer 10 as data during the time period that target program 3 is executing out of temporary holding area 2. The theory behind this fourth embodiment is that one of these other programs 7 could be acting as a proxy for the worm 3, i.e., the worm has disguised itself by placing itself in some area other than temporary holding area 2. Out of the four embodiments described herein, this fourth embodiment probably has the highest risk of a false positive.

In this fourth embodiment, step 31 entails alerting the user when target program 3 opens for execution out of the temporary holding area 2. Again, this warns the user of the possibility of a worm being present within computer 10.

In this fourth embodiment, executing false positive mitigation procedure 32 results in module 5 allowing e-mail programs 1 on computer 10 to open other executable programs 7 as data during the time period that target program 3 is executing out of temporary holding area 2, when module 5 deems that said opening is a false positive, based upon preselected criteria.

In this embodiment, said false positive criteria may be criteria 2 and 3 as described above.

In this fourth embodiment, optional step 33 entails processing target program 3 when target program 3 opens for execution out of temporary holding area 2. As before, step 33 can entail any one of the five options detailed above.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for blocking the replication of computer worms in a computer, said method comprising the steps of:

for an e-mail program installed on the computer, finding the location of a temporary holding area used by the e-mail program for storing and opening e-mail attachments, the email attachments comprising target programs;

monitoring the temporary holding area for openings of target programs stored within the temporary holding area;

implementing a worm mitigation procedure when a target program is opened for execution and prior to detection of a worm in the target program, wherein the worm mitigation procedure comprises preventing the target program from accessing port 25; and when the target program attempts to access port 25:
  alerting a user of the computer; and
  executing a false positive mitigation procedure, wherein the target program is allowed to access port 25 when a false positive is found.

2. The computer-implemented method of claim 1 wherein the worm mitigation procedure further comprises preventing the target program from opening itself as data.

3. The computer-implemented method of claim 2 wherein a user of the computer is alerted when the target program attempts to open itself as data.

4. The computer-implemented method of claim 2 further comprising the step of processing the target program when the target program attempts to open itself as data.

5. The computer-implemented method of claim 1, wherein a false positive is found when the target program is a self extractor.

6. The computer-implemented method of claim 1 wherein the worm mitigation procedure further comprises preventing any program anywhere on the computer from opening the target program as data.

7. The computer-implemented method of claim 6 wherein a user of the computer is alerted when any program anywhere on the computer attempts to open the target program as data.

8. The computer-implemented method of claim 6 further comprising the step of processing the target program when any program anywhere on the computer attempts to open the target program as data.

9. The computer-implemented method of claim 1 wherein a false positive is found when the target program has a valid digital signature affixed thereto.

10. The computer-implemented method of claim 1 wherein a false positive is found when
the target program passes an additional test selected by the false positive mitigation procedure.

11. The computer-implemented method of claim 1 further comprising the step of processing the target program when the target program attempts to access port 25.

12. The computer-implemented method of claim 1 wherein the worm mitigation procedure further comprises blocking all e-mail programs on the computer from opening any executable program on the computer as data during the time period that the target program is executing out of the temporary holding area.

13. The computer-implemented method of claim 12 further comprising the step of alerting a user of the computer when the target program opens itself for execution out of the temporary holding area.

14. The computer-implemented method of claim 12 further comprising the step of processing the target program when the target program opens for execution.

15. The computer-implemented method of claim 1 further comprising the step of:
before performing the method steps of claim 1, locating all e-mail programs installed on the computer; wherein the method steps of claim 1 are performed for each e-mail program installed on the computer.

16. An apparatus for blocking the replication of computer worms in a computer, said apparatus comprising:

means for finding a temporary holding area used for storing and opening e-mail attachments by an e-mail program installed on the computer, the email attachments comprising target programs;

coupled to the temporary holding area, a file system filter driver adapted to monitor openings of target programs stored within the temporary holding area; and coupled to the file system filter driver, a worm mitigation module adapted to:
  execute a worm mitigation procedure when a target program is opened for execution prior to detection of a worm in the target program, wherein the worm mitigation procedure comprises preventing the target program from accessing port 25; and
  when the target program attempts to access port 25:
  alert a user of the computer; and
  execute a false positive mitigation procedure, wherein the target program is allowed to access port 25 when a false positive is found.

17. The apparatus of claim 16 further comprising:
coupled to the means for finding a temporary holding area, means for locating all e-mail programs installed on the computer.

18. A computer-readable storage medium storing computer program instructions for blocking the replication of computer worms in a computer, said computer program instructions performing the steps of:

for an e-mail program installed in memory on the computer, finding the location of a temporary holding area in memory on the computer used by the e-mail program for storing and opening e-mail attachments, the email attachments comprising target programs;

monitoring the temporary holding area for openings of target programs stored within the temporary holding area;

implementing a worm mitigation procedure when the target program opens itself for execution and prior to detection of a worm in the target program, wherein the worm mitigation procedure comprises preventing the target program from accessing port 25; and when the target program attempts to access port 25:
  alerting a user of the computer; and
  executing a false positive mitigation procedure, wherein the target program is allowed to access port 25 when a false positive is found.

19. The computer-readable storage medium of claim 18 wherein the worm mitigation procedure further comprises processing the target program.

20. The computer-readable storage medium of claim 19 wherein processing the target program comprises blocking execution of a method being performed by the target program.

21. The computer-readable storage medium of claim 19 wherein processing the target program comprises blocking a method being performed by the target program and quarantining the target program.

22. The computer-readable storage medium of claim 19 wherein processing the target program comprises attempting a repair of the target program and, when the repair is successful, allowing the method being performed by the target program to proceed.

23. The computer-readable storage medium of claim 19 wherein processing the target program comprises allowing a method being performed by the target program to proceed, upon instructions received from a user of the computer.

24. The computer-readable storage medium of claim 18 wherein said computer program instructions perform the step of:

before performing the method steps of claim 18, locating all e-mail programs installed on the computer; wherein the method steps of claim 18 are performed for each e-mail program installed on the computer.

* * * * *